United States Patent
Schlichting

(10) Patent No.: US 9,393,997 B2
(45) Date of Patent: Jul. 19, 2016

(54) METHOD FOR MOVING BACKWARDS A COMBINATION AND ASSEMBLY FOR ASSISTING THE BACKWARD MOVEMENT OF THE COMBINATION

(71) Applicant: FORAGE INNOVATIONS B.V., Maassluis (NL)

(72) Inventor: Malte Cornelius Schlichting, Wolfenbüttel (NL)

(73) Assignee: FORAGE INNOVATIONS B.V., Maassluis (NL)

( * ) Notice: Subject to any disclaimer, the term of this patent is extended or adjusted under 35 U.S.C. 154(b) by 1 day.

(21) Appl. No.: 14/528,523

(22) Filed: Oct. 30, 2014

(65) Prior Publication Data
US 2015/0120143 A1 Apr. 30, 2015

(30) Foreign Application Priority Data
Oct. 31, 2013 (NL) ..................... 2011713

(51) Int. Cl.
*B62D 13/06* (2006.01)
*B62D 15/02* (2006.01)

(52) U.S. Cl.
CPC ............. *B62D 13/06* (2013.01); *B62D 15/028* (2013.01); *B62D 15/0285* (2013.01)

(58) Field of Classification Search
CPC ..................... B62D 6/00; B62D 6/001; B62D 13/00–13/005; B62D 13/06; B62D 15/00–15/02; B62D 15/021; B62D 15/024; B62D 15/025; B62D 15/0265; B62D 15/027–15/0285; B62D 15/029–15/0295; B60Y 2300/28
USPC ............ 701/36, 41, 48–50; 340/684; 56/14.7, 56/14.9, 15.4; 180/421
See application file for complete search history.

(56) References Cited

U.S. PATENT DOCUMENTS

| | | | | |
|---|---|---|---|---|
| 2005/0000738 A1* | 1/2005 | Gehring | ............. | B62D 15/0285 180/14.1 |
| 2008/0312792 A1* | 12/2008 | Dechamp | ............... | B62D 13/06 701/41 |
| 2009/0306854 A1* | 12/2009 | Dechamp | ............. | B62D 15/027 701/41 |
| 2012/0185131 A1* | 7/2012 | Headley | ................. | B60D 1/245 701/41 |
| 2012/0271515 A1* | 10/2012 | Rhode | ..................... | B62D 1/22 701/42 |

(Continued)

FOREIGN PATENT DOCUMENTS

DE 10312548 B3 5/2004
DE 102009039111 A1 3/2011

*Primary Examiner* — Bao Long T Nguyen
(74) *Attorney, Agent, or Firm* — Birch, Stewart, Kolasch & Birch, LLP

(57) ABSTRACT

A method is provided for moving backwards a combination and an assembly is provided for assisting the backward movement of a combination into an area, which might be surrounded by obstacles. The combination includes a propelled vehicle and an implement. The implement can pivot with respect to the vehicle. The vehicle moves the combination backwards. A pivoting angle sensor on board of the combination measures the pivoting angle of the implement with respect to the vehicle. A distance sensor on board of the implement measures the distance to a border of the area. A path sensor on board of the implement measures the length of a path along which the implement is moved. A computer on board of the implement calculates a required change of the travelling direction of the vehicle by using the pivoting angle, the path length, and the measured distance. A signal indicative of the required change is transmitted to an output unit.

16 Claims, 2 Drawing Sheets

(56) References Cited

U.S. PATENT DOCUMENTS

| | | | | |
|---|---|---|---|---|
| 2013/0024064 A1* | 1/2013 | Shepard | ............... | B62D 13/06 701/23 |
| 2014/0058655 A1* | 2/2014 | Trombley | ............... | B60R 1/00 701/300 |
| 2014/0218522 A1* | 8/2014 | Lavoie | ............... | G08G 1/0962 348/148 |
| 2014/0222288 A1* | 8/2014 | Lavoie | ............... | G06F 17/00 701/41 |
| 2014/0229070 A1* | 8/2014 | Witting | ............... | B62D 13/06 701/42 |
| 2014/0303847 A1* | 10/2014 | Lavoie | ............... | B62D 13/06 701/41 |
| 2015/0057903 A1* | 2/2015 | Rhode | ............... | B60T 8/1708 701/70 |
| 2015/0149040 A1* | 5/2015 | Hueger | ............... | B62D 13/06 701/41 |
| 2015/0158527 A1* | 6/2015 | Hafner | ............... | B60D 1/245 701/41 |
| 2015/0197281 A1* | 7/2015 | Miller | ............... | B62D 13/06 701/41 |

* cited by examiner

METHOD FOR MOVING BACKWARDS A COMBINATION AND ASSEMBLY FOR ASSISTING THE BACKWARD MOVEMENT OF THE COMBINATION

CROSS-REFERENCE TO RELATED APPLICATIONS

This application claims priority under 35 U.S.C. §119(a) to Application No. 2011713, filed in The Netherlands on Oct. 31, 2013, the entirety of which is expressly incorporated herein by reference.

BACKGROUND OF THE INVENTION

1. Field of the Invention

The present invention refers to a method for moving backwards a combination into an area that might be surrounded by obstacles. The combination to be moved backwards comprises a propelled vehicle, e.g. a tractor, and an implement, e.g. a non-propelled agricultural baler or loader wagon or a trailer. The area can be a parking lot. The implement is coupled with the propelled vehicle by means of a coupling assembly and can pivot with respect to the propelled vehicle around a vertical pivoting axis. The present invention further refers to an assembly for assisting the backward movement of such a combination.

2. Background of the Invention

DE 102009039111 A1 discloses a method for moving a combination backwards. The combination (15) comprises a tractor truck (1) pulling a trailer (2). The trailer 2 can pivot with respect to the tractor 1 around a vertical pivoting axis, cf. FIG. 1. In one embodiment, the combination 15 is to be moved backwards into an area for parking the combination 15. The current pivoting angle (11) between the tractor 1 and the trailer 2 is measured. For measuring the pivoting angle, the orientation of the tractor and that of the trailer 2 are determined by using signals from several GPS receivers 5. One GPS receiver 5.1 is mounted on board of the tractor 1 and a further GPS receiver 5.2 is mounted on board of the trailer 2, cf. FIG. 3. A projecting and measuring system (4) is arranged on board of the trailer 2 and measures the environment of the trailer 2. A trajectory (13) of the combination 15 is calculated. For doing so, the measured pivoting angle 11 between tractor 1 and trailer 2, geometric data about the environment, dimensions of the trailer, and the position of the target point 12 are used. A vehicle navigation system (28) calculates the trajectory 13 which is used in a driver assistance system.

In DE 10312548 B3 a propelled vehicle (1) with two distance sensors (3, 3') mounted at the rear edge (2) of the vehicle is described. The vehicle 1 can pull an implement (5) coupled with the vehicle 1 by means of a coupling unit (6) and an electrical connection (7, 9). A detection sensor (4) can detect whether or not an implement 5 is coupled with the propelled vehicle 1. The distance sensors 3, 3' can either operate for assisting the driver when driving the vehicle 1 backwards without an implement into a parking lot (Mode A) or can determine the articulation angle (Mode B) between the longitudinal axis of the vehicle 1 and that of the implement 5 actually coupled with the vehicle. When being operated in the mode B, the vehicle 1 pulls the implement 5 forwardly. The assistance mode is only activated when the vehicle 1 is driven backwards. The distance between the vehicle 1 and an obstacle (1) is determined. In the case that the vehicle 1 pulls an implement and drives into a curve, the two sensors 3, 3' measure two different distance values.

SUMMARY OF THE INVENTION

A problem solved by the present invention is to provide a moving method for moving a combination and an assisting assembly for assisting the movement of a combination, wherein no geo-position sensor is required and wherein no data about the implement needs to be transferred to the vehicle to calculate the required travelling direction change.

The present invention refers to a method for moving a combination backwards into an area. This area might be surrounded by obstacles. The present invention further refers to an assembly for assisting this backward movement into the area.

The combination comprises a propelled vehicle and an implement. The implement may be propelled or may be non-propelled. The implement is mechanically coupled with the vehicle by means of a towing unit. The implement can pivot with respect to the propelled vehicle around a pivoting axis being perpendicular to the ground.

A steering mechanism is mounted on board of a vehicle. This steering mechanism can change the travelling direction of the propelled vehicle.

The propelled vehicle moves backwards. The implement is positioned in front of the vehicle when the vehicle moves backwards. The propelled and steered vehicle moves the combination backwards into the area.

The assisting assembly comprises: a path sensor, a distance sensor, a pivoting angle sensor, and a computer.

The distance sensor, the path sensor, and the computer are mounted on board of the implement. The pivoting angle sensor is mounted on board of the combination, i.e. is mounted on board of the vehicle, of an implement, or partly on board of the vehicle and partly on board of the implement.

According to an embodiment of the present invention, the following sequence is performed at least once while the combination is moved backwards into the area:

The pivoting angle sensor measures a value indicative of the pivoting angle or of a change of the pivoting angle. This pivoting angle is the angle between the current travelling direction of the implement and that of the propelled vehicle.

The distance sensor measures, at least once, a value indicative of the distance to a border of the area in at least one direction.

The path sensor measures a value indicative of the length of a path along which the implement is moved.

The computer automatically calculates a required change of the travelling direction of the vehicle. For calculating the required travelling direction change, the computer uses the measured pivoting angle, the measured path length, and the measured distance.

A signal indicative of the required travelling direction change is output and is used for operating the steering mechanism and thereby for steering the propelled vehicle.

ADVANTAGES

The task of steering a combination with a propelled vehicle and a pivotally coupled implement backwards is more complicated than just steering a propelled vehicle backwards. The propelled vehicle shifts the implement, which is in front of the propelled vehicle. Therefore, the implement can be pivoted with respect to the vehicle around a vertical axis during the movement backwards. Small changes in the travelling direction of the pushing vehicle can cause large changes in the travelling direction of the shifted implement. The implement must not hit a rigid object forming a border of the area. The implement may cover and therefore inhibit the view of a vehicle's driver onto an obstacle behind the implement such that the driver cannot detect this obstacle.

In accordance with an embodiment of the present invention, it is possible but not necessary that the implement comprises a steerable axle with wheels. It is also possible that the or every axle of the implement cannot be steered and cannot be pivoted, i.e. the or every implement axle is always perpendicular to the current travelling direction of the implement.

According to an embodiment of the present invention, the following sensors, which are implemented on board of the implement, deliver values that are used by the computer for calculating a required change in the travelling direction of the vehicle: the path sensor; and the distance sensor.

The pivoting angle sensor is implemented on board of the implement or of the propelled vehicle or is distributed over both parts of the combination. As the computer, which calculates the travelling direction change, is mounted on board of the implement and not on board of the vehicle, no data about the implement needs to be transferred to the vehicle.

The required travelling direction change is effected by a change of the steering angle for the steering mechanism on board of the pushing vehicle. Calculating the steering angle change can require data about the implement, in particular a dimension. According to an embodiment of the present invention the computer, which calculates the required steering angle change, is implemented on board of the implement. Therefore, it is not necessary that a computer on board of the propelled vehicle calculates this steering angle change. This feature saves the needs of transferring data about the implement to a computer on board of the propelled vehicle and of establishing a data connection. In particular no signal comprising a dimension of the implement needs to be transmitted to the vehicle. Nevertheless, the same implement can subsequently be coupled with different propelled vehicles and can be moved backwards by every connected vehicle.

It is possible, but not necessary, to use a sensor on board of the propelled vehicle. Therefore the present invention can be implemented on board of the implement and the implement can subsequently be coupled with different propelled vehicles without the need of establishing data communication and data connection between the implement and that propelled vehicle, which is currently coupled with the implement and currently moves the combination. The operator can be assisted without the need of relying on a sensor, which is arranged on board of the propelled vehicle. In addition, no value measured by a sensor on board of the propelling vehicle and no user input are required for calculating the steering angle change.

The method and the assembly according to the present invention can be implemented by using at least one sensor for the current geoposition, e.g. a GPS-receiver, of the vehicle and/or of the implement. However, due to the present invention, such a geoposition sensor is not necessary. Not relying on such a sensor is an advantage as such a sensor may not deliver reliable results or no results at all when being operated in a building or beside a building.

Due to the present invention, an operator—in particular a driver of the vehicle—is assisted and supported in the process of steering the combination backwards. The driver can stay in the vehicle and can permanently use the steering mechanism. Due to the present invention, neither a person assisting the driver, nor an image acquisition system for the driver are required. The present invention can nevertheless be implemented on board of the implement. Therefore, the same propelled vehicle can subsequently be coupled with different implements, all comprising an implementation of the present invention. Alternatively, the same implement comprising an implementation of the present invention can subsequently be coupled with different propelled vehicles, in particular with vehicles from different producers.

This advantage is in particular important for an agricultural combination comprising a tractor as the propelled vehicle and an agricultural non-propelled implement with wheels, e.g. a wagon, a baler, a field chopper, a mowing vehicle, or a haymaking device. Due to the present invention, the same agricultural implement can be coupled with different tractors. This is important as often the implement and the tractor are produced by different manufacturers. The implement manufacturer needs not adapt the implement to a specific tractor.

PREFERRED EMBODIMENTS

Preferably, the implement does not comprise its own drive for moving the implement over ground. Such a drive is often not required, in particular while the implement is parked and is separated from the vehicle. Due to the present invention, such a seldom-used part and an energy supply for this drive can be eliminated.

In one embodiment, the implement comprises at least one axle on which several wheels are mounted. The wheels roll over ground when the combination is moved backwards. The axle or every axle of the implement is always positioned perpendicular to the current travelling direction of the implement. The implement axle is not steerable. This enables a simple mechanical construction of the implement's chassis. Nevertheless the combination can be moved into the area due to the present invention.

According to an embodiment of the present invention, the computer for calculating the travelling direction change is implemented on board of the implement. The path sensor, the distance sensor(s) and in one embodiment the pivoting angle sensor are also implemented on board of the implement. In one embodiment, the computer is connected with these sensors by means of a data network, e.g. a CAN bus. In one embodiment, the output unit is arranged on board of the propelled vehicle.

In one embodiment, the distance sensor—or several distance sensors—measures the distance between the implement and a respective border of the area in several different directions. One measuring direction may be straight on backwards, i.e. in the travelling direction of the implement when the implement is moved backwards. At least one further direction may be perpendicular or at an angle to this travelling direction.

In one embodiment, the required change of the travelling direction is communicated to a human operator in a form perceptible by a human, e.g. displayed on a display unit or communicated per speech output or by further acoustical signals. This human operator can work on board of the vehicle and can operate the steering mechanism of the vehicle.

It is also possible that a human operator works outside of the vehicle and carries a portable computer, e.g. a smartphone. The calculated required travelling direction change is transmitted to this portable computer, preferably via wireless data communication. The portable computer belongs to the output unit and displays a message about the required travelling direction change to the operator or otherwise outputs the message in a human-perceptible form. The operator steers the vehicle by using the portable computer. The portable computer can be connected with a control input of the propelled vehicle by means of a wireless data connection or by means of a data cable. The operator makes user inputs into the portable computer and the portable computer generates control inputs, which are transmitted to the vehicle's control unit.

In this embodiment, the operator can have a better overview about the area in front of the implement being moved backwards. The operator can change his/her position with respect to the combination.

In a further embodiment, the calculated steering angle change is used for automatically steering the vehicle, e.g. for automatically pivoting a steerable axle of the propelled vehicle around the calculated change of the travelling direction. In this embodiment, a signal indicative of the calculated steering angle change is transmitted to a control unit of the vehicle.

In one embodiment, the computer on board of the implement does not necessarily calculate the required steering angle of the vehicle itself but calculates a required increment of the steering angle and therefore an increment of the travelling direction change. This required increment is output in a human-perceptible form or is communicated to a control unit of the vehicle or to an operator.

In one embodiment, the sequence of the method is performed several times. A sequence of sample time points is given. The path sensor on board of the implement measures the length of the path over which the implement is moved between two consecutive time points. The computer on board of the implement calculates the respective required change in the travelling direction for every time point. The computer uses the measured pivoting angle or pivoting angle change in the preceding time point or in several preceding time points.

In one embodiment, a data connection between the propelled vehicle and the computer on board of the implement is established, e.g. according to the ISOBUS standard (ISO 11783). The data connection may be established by means of a cable between the vehicle and the implement or by a wireless connection. The actual travelling direction of the vehicle is measured by means of a sensor mounted on board of the vehicle. This measured value is transmitted to the computer on board of the implement via the data communication. The current travelling direction of the propelled vehicle and the current pivoting angle together yield the current travelling direction of the pushed implement. The computer uses this current actual travelling direction for calculating a required change of the travelling direction.

In one implementation, the output unit is mounted on board of the propelled vehicle. The signal indicative of the required change is transmitted to this output unit via this data connection.

In one implementation, the output unit outputs the signal indicative of the required change in a human-perceptible form. This implementation enables a human operator on board of the propelled vehicle to steer manually the combination.

In a further implementation, the output unit is connected with a control unit for the vehicle. This control unit automatically steers the vehicle. The control unit processes signals from the output unit indicative of the required change. It is possible that the same control unit on board of the vehicle serves as the output unit as well as the control unit. This control unit can also be arranged on the implement and the implement is connected with the propelled vehicle by means of a data connection.

In one embodiment, a sensor, e.g. a GPS receiver, measures several times the current geoposition of the combination, e.g. with a given sample rate. Preferably, this geoposition sensor is arranged on board of the implement such that no geoposition signals need to be transmitted from the vehicle to the computer on board of the implement. The computer on board of the implement processes signals indicative of the geoposition for calculating the required travelling direction change. The current travelling direction of the vehicle is derived from the latest measured geopositions.

In one embodiment, the steering mechanism of the propelled vehicle comprises a steerable axle and mechanism configured to steering this steerable axle, e.g. a steering wheel. The steerable axle can pivot with respect to the current travelling direction of the propelled vehicle. A sensor mounted on board of the vehicle measures the steering angle, i.e. the angle between: the direction into which the wheels on the steerable axle rotate; and the longitudinal axle of the vehicle.

If this steering angle is equal to zero, the vehicle moves straight ahead, forwards or backwards, i.e. does not follow a curve. This measured steering angle is used as the current change in the travelling direction of the vehicle. The current travelling direction of the implement is the difference between the current travelling direction of the vehicle and the pivoting angle between vehicle and implement. A signal indicative of this current change is transmitted to the computer on board of the implement. The computer calculates a desired travelling direction change and derives an increment as the difference between required and actual travelling direction change.

In a further embodiment, the calculated change in the travelling direction is used for obtaining the travelling direction. It is assumed that the actual change of the travelling direction is equal to the calculated required change.

In one embodiment, the implement is a non-propelled agricultural vehicle, e.g. a bale forming apparatus, a loader wagon, a further harvester, a hay making machine, a sprayer, a mowing vehicle, or a non-propelled field chopper. The propelled vehicle is an agricultural motorized vehicle, e.g. a tractor, a combine harvester, or a propelled field chopper. This agricultural vehicle performs an agricultural function referring to plants or crop material on an agricultural field.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
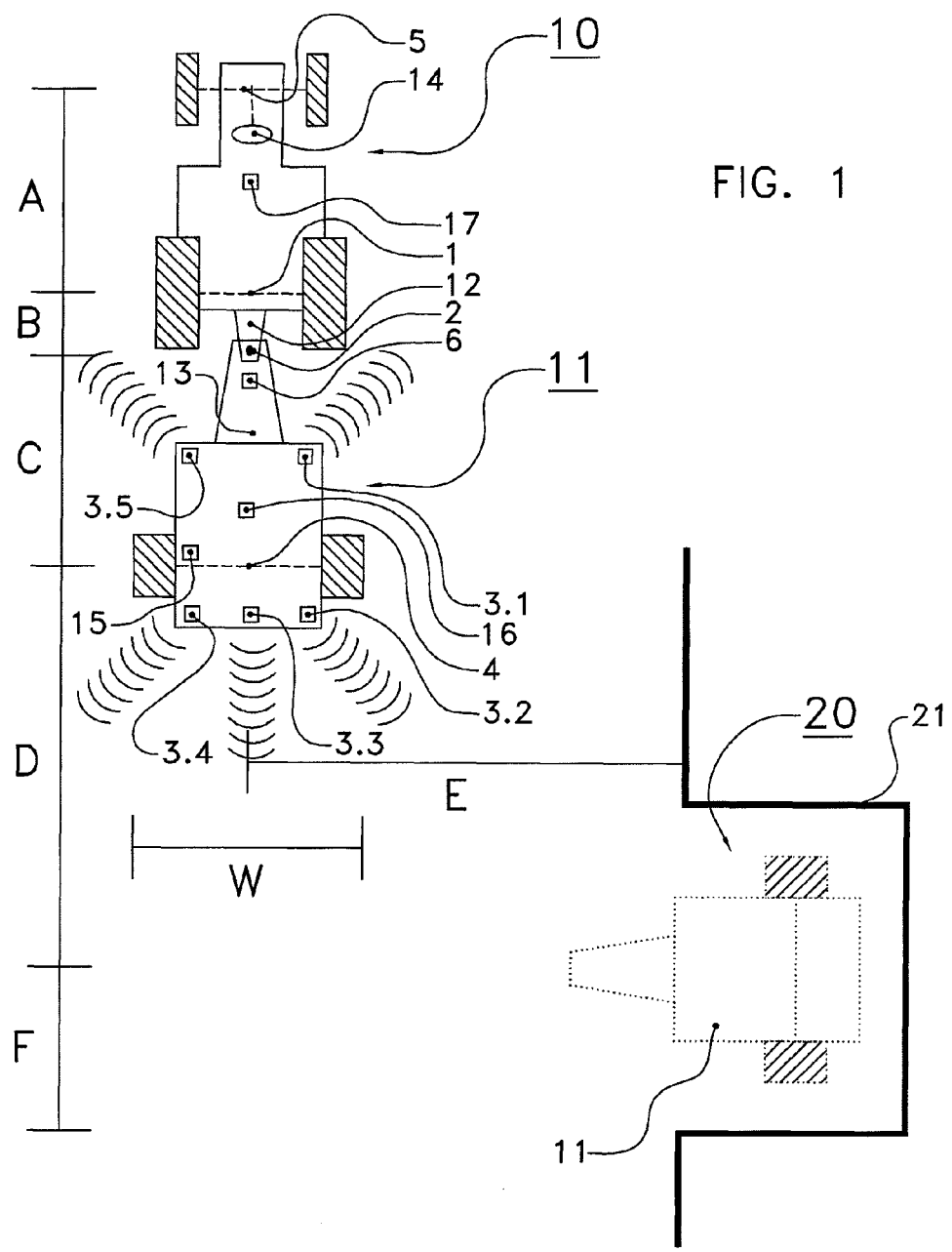
FIG. 1 shows a combination with a tractor and an implement before being moved backwards and the area into which the implement has to be moved.

The present invention will now be described with reference to the accompanying drawings, wherein the same or similar elements are identified with the same reference numeral.

In an embodiment, the present invention is used for steering an agricultural combination backwards into an area 20, which is partially surrounded by a rigid border 21, cf. FIG. 1. This border 21 may be provided by walls of a building, e.g. The area 20 may be a parking lot or a lot for changing the travelling direction of the combination or for altering the coupling order between the parts of the combination. The combination is moved backwardly into the area 20 and can be moved forwardly out of the area 20. No part of the combination should hit the border 21 as otherwise the combination part or the border 21 may be damaged.

The combination comprises a propelled tractor 10 and a non-propelled agricultural implement 11, e.g. a baler or a loader wagon or further harvester. The desired position of the implement 11 after the backward movement is shown in FIG. 1 in dotted lines. The rear edge of the implement 11 forms the front site when the combination 10, 11 is moved backwards.

The tractor 10 and the implement 11 are mechanically coupled: by means of a towing unit 13, which is part of the implement 11; and by means of a corresponding coupling unit (hitch) 12 of the tractor 10.

Figure 2:
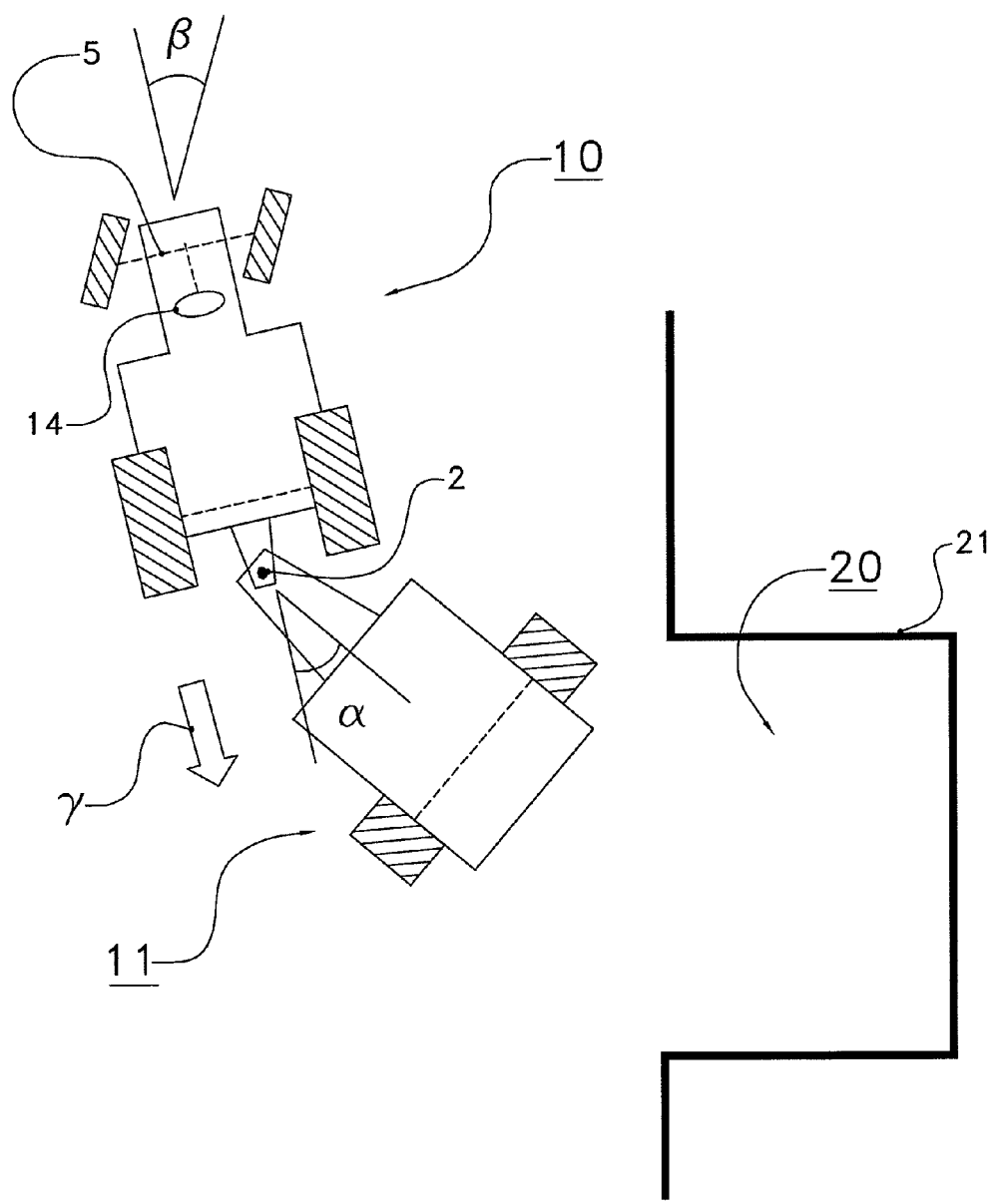
FIG. 2 shows the combination of FIG. 1 during the backward movement.

When being moved, the implement 11 can pivot with respect to the tractor 10 around a pivoting axis 2, which is perpendicular to the ground and perpendicular to the drawing plane of FIG. 1 and FIG. 2. This pivoting axis 2 is also perpendicular to the travelling directions of the vehicle 10 and that of the implement 11.

As is usual, the tractor 10 has two front wheels and two rear wheels. At least the rear wheels are propelled by a motor on board of the tractor 10. The front wheels are mounted on a propelled or a non-propelled front axle 5. The rear wheels are mounted on the rear axle 1 propelled by the tractor motor. The front axle 5 with the front wheels is steerable. A steering mechanism 14, e.g. a steering wheel and a connecting mechanism between the steering wheel and the front axle 5, can rotate the front axle 5.

The implement 11 comprises the following parts which are arranged on board of the implement 11:
- parts for performing agricultural functions, e.g. a pick-up unit for picking up crop material from the ground, a conveying and/or cutting device, and a chamber for storing and/or pressing the picked-up crop material;
- a non-steerable idler axle 4 with two wheels rolling over the ground;
- an electronic control unit 16 with a processing unit and a memory;
- a left distance sensor unit 3.4, 3.5;
- a right distance sensor unit 3.1, 3.2;
- a path sensor 15; and
- a pivoting angle sensor 6.

The left distance sensor unit 3.4, 3.5 measures the distance between
- the left sidewall of the implement 11 and
- a border 21.

In one embodiment, the left distance sensor unit 3.4, 3.5 measures the distance in three directions which are schematically shown by waves:
- parallel to the current travelling direction of the implement 11;
- in a direction perpendicular to the travelling direction and pointing leftward; and
- in a direction between these two directions, e.g. in a direction with an angle of 45 degrees to the current travelling direction of the implement 11.

The right distance sensor unit 3.1, 3.2 of the embodiment also measures in three directions, namely parallel to the current travelling direction of the implement 11, perpendicular rightward and in a direction between the parallel and the perpendicular direction.

The left distance sensor unit 3.4, 3.5 is arranged in the left sidewall of the implement 11 and can comprise several single sensors, e.g. one sensor 3.4 in the left rear corner of the implement 11 and one sensor 3.5 in the middle or front part of the left sidewall. The right sensor unit 3.1, 3.2 can also comprise several sensors in the right sidewall. The left sensor unit 3.4, 3.5 measures the distance parallel to the current implement travelling direction with a lateral offset to the middle axis of the implement 11. The right sensor unit 3.1, 3.2 measures the distance parallel to the current travelling direction of the implement 11 with a lateral offset right of the middle axis.

In an alternative embodiment the implement 11 comprises three sensor units, cf. FIG. 1, namely a left sensor unit 3.4, 3.5; a central sensor unit 3.3; and a right sensor unit 3.1, 3.2.

The central sensor unit 3.3 measures the distance between the rear edge of the implement 11 and a possible obstacle 21 in the current travelling direction of the implement 11, i.e. along the middle axis of the implement 11. The implement 11 is positioned between the tractor 10 and this possible obstacle.

The left distance sensor unit 3.4, 3.5 measures the distance in two directions: perpendicular to the current implement travelling direction leftwards; and in a direction angularly to the left.

The right distance sensor unit 3.1, 3.2 measures the distance in two directions: perpendicular to the current implement travelling direction rightwards; and in an angular direction angularly to the right.

In one embodiment, the sensor units 3.1, . . . , 3.5 emit ultrasonic waves and measure the time period until the reflection from the border 21 reaches the corresponding sensor unit. The sensor units 3.1, . . . , 3.5 can also emit infrared waves or laser beams. A mixture of different kinds of sensors is also possible.

The implement 11 comprises two wheels, which are mounted on the idler axle 4 or on two single idler axles. In the memory of the control unit 16, the diameter or the circumferential length of these wheels is stored. In one embodiment, the path sensor 15 counts the number of rotations of the one idler axle 4 or an average of the rotation numbers of the two idler axles. The path sensor can comprise an encoder roller. The rotation numbers and the diameter yield the distance over which the implement 11 is moved. For a more precise measurement, the path sensor 16 further measures the current rotating angle of the idler axle 4.

The pivoting angle sensor 6 measures the pivoting angle α between: the longitudinal axis of the towing unit 13 belonging to the implement 11; and the longitudinal axis of the corresponding coupling unit 12 of the tractor 10.

This pivoting angle α is a measure for the angle between: the longitudinal axes of the implement 11; and the longitudinal axis of the tractor 10, cf. FIG. 2.

In one implementation, the pivoting angle sensor 6 comprises a potentiometer and an evaluation unit. In the embodiment, the pivoting angle sensor 6 is mounted on board of the implement 11.

The control unit 16 of the implement 11 is connected with the sensors 3.1, . . . , 3.5, 6, 13 arranged on board of the implement 11, preferably by means of a CAN bus or a further vehicle data bus. The processing unit of the control unit 16 on board of the implement 11 obtains signals from these sensors 3.1, . . . , 3.5, 6, 13 and has access to the memory.

The following dimensions of the implement 11 are stored on the memory of the control unit 16, cf. FIG. 1:
the width W of the implement 11, i.e. the largest dimension of the implement 11 perpendicular to the travelling direction;
the distance C between the vertical pivoting axis 2 through the towing unit 12, 13 and a line through the idler axle 4 or the two idler axes for the two wheels of the implement 11; and
in one embodiment the distance G between the rear edge of the implement 11 and the line through the idler axle/axles 4.

These dimensions W, C, G of the implement 11 do not vary during regular operation. Therefore the dimensions can be stored in advance, in particular during manufacturing or delivering of the implement 11.

In one embodiment, the implement 11 comprises a display unit (not shown) for displaying messages in a human-readable form to an operator. This display unit is connected with the control unit 16 of the implement 11 via a cable for data transmission. The display unit can display messages, which are generated by the control unit 16. The display can manually be shifted into a suitable holding unit in the driver's cabin of the tractor 10 and can be pulled out of this holding unit. The driver can watch the display while driving and steering the tractor 10.

In an alternative embodiment, the messages for steering the combination are displayed on a display unit, which is part of the tractor 10. The control unit 16 of the implement 11 is connected with the control unit 17 of the tractor 10 by means of a data connection, e.g. according to ISO 11783. The control unit 16 of the implement 11 generates messages, which are transmitted via a line or cable or wireless to the control unit 17 of the tractor 10. The control unit 17 of the tractor 10 also generates signals for the control unit 16 of the implement 11, e.g. a signal indicative of the current steering angle $\beta$ of the tractor 10. The tractor's control unit 17 triggers the display unit to display messages to the operator. This display unit is mounted in the driver's cabin of the tractor 10.

In one implementation of the display unit, the required steering angle change is displayed by at least one arrow pointing to the left or to the right. The arrow is displayed until the actual steering angle is identical with the required steering angle. In this implementation, a sensor on board of the tractor 10 measures the current steering angle. The control unit 17 compares the current steering angle with the desired steering angle. A closed-loop control is performed.

It is also possible to communicate steering messages to the operator by means of speech output.

In a further embodiment, the display unit is a part of a portable computer carried by an operator. The control unit 16 on board of the implement 11 transmits signals indicative of a required travelling direction change to the portable computer. The operator using the portable computer makes inputs into the portable computer, wherein the inputs refer to steering angle changes of the tractor 10. The portable computer generates control inputs and transmits them to the tractor control unit 17.

In the embodiment, values indicative of the following dimensions of the tractor 10 are provided to the implement's control unit 16 and are stored on its memory: the distance A between the front axle 5 and the rear axle 1; the distance B between the rear axle 1 and the vertical pivoting axis 2 through the towing units 13, 12.

These dimensions of the tractor 10 do not vary during regular operation. But it is possible to connect the same implement 11 with a first tractor and afterwards with a second tractor. As these tractors may have different dimensions, the respective dimensions of the tractor are preferably communicated to the implement's control unit 16 every time a data connection between the implement 11 and a tractor 10 is established.

In one implementation, default values for the dimensions A and B are stored. The operator can change the stored default values before steering the tractor 10, preferably by a user input terminal.

The present invention is used for moving the combination 10, 11 into the area 20 without hitting the border 21 of this area 20. The combination 10, 11 is moved into the area 20 such that the implement 11 is in front of the tractor 10. Therefore, the tractor 10 pushes the implement 11. When performing agricultural functions on a field or when moving the implement 11 over a public street, however, the tractor 10 is ahead of the implement 11 and pulls the implement 11.

According to one embodiment, the present invention provides assistance for an operator driving the tractor 10. According to a further embodiment of the present invention, the tractor control unit 17—or the implement control unit 16—automatically steers the tractor 10. In both embodiments, the execution of the method according to the present invention is triggered as soon as the implement 11 passes a parking spot or a further triggering device when being moved backwards. In one embodiment, the operator in the driver's cabin pulls a button on the display unit of the implement 11 held in the cabin or a button or a touch screen of the display unit of the tractor 10. In a further embodiment, a suitable sensor measures automatically that the implement 11 passes the parking spot. This sensor may obtain signals from a stationary beacon or a balise, e.g.

A sequence $t(0), t(1), \ldots$ of time points is given to the method and is stored in the memory. The time point $t(0)$ is the time point at which the rear edge of the implement 11 passes the parking spot. At the time point $t(0)$ the execution of the method and in particular the calculation of the time points $t(0), t(1) \ldots$ is triggered. In one embodiment, a sampling rate with a fixed period $\Delta$ is given and the time points are determined according to $t(i)=t(0)+i*\Delta(i=1, 2, \ldots)$.

As can be seen in FIG. 2, the tractor 10 currently moves into a travelling direction $\gamma$. As this travelling direction depends on the time t, this current travelling direction for the time point $t(i)$ is denoted by $\gamma(i)$. The tractor steering angle, that is the angle between the longitudinal axis of the tractor 10 and the current rotating direction of the front wheels on the steerable axle 5, is denoted by $\beta(i)$. This steering angle $\beta(i)$ is equal to the desired change of the tractor's travelling direction $\gamma(i)$.

In the time period between $t(i-1)$ and $t(i)$ a sequence with the following steps is performed ($i=1, 2, \ldots$):
The path sensor 15 measures, at least once, the distance over which the implement 11 is moved in the time period between $t(i-1)$ and $t(i)$.
The distance sensor units 3.1, . . . , 3.5 measure, at least once, the respective current distances to the borders 21 in the different directions as mentioned above.
The pivoting angle sensor 6 measures the current pivoting angle $\alpha(i)$ between the implement 11 and the tractor 10, e.g. the current pivoting angle in the towing unit 12, 13.

When the implement 11 passes the parking spot, the tractor 10 moves backwardly with an initial tractor steering angle $\beta(0)$. This initial tractor steering angle $\beta(0)$ is the angle between the longitudinal axis of the tractor 10 and the current moving direction of the tractor front wheels. This initial steering angle $\beta(0)$ equals with the steering angle of the tractor's steering wheel 14. In one embodiment, this initial steering angle $\beta(0)$ is measured by means of a suitable sensor on board of the tractor 10. This measured initial steering angle β(0) is transmitted to the implement's control unit 16 via the data connection. In an alternative embodiment, this initial steering angle β(0) is assumed to be zero, i.e. the tractor 10 drives straight ahead backwards.

In the first time period from t(0) to t(1), the implement's control unit 16 calculates a required trajectory of the implement 11 using the following measured values:

- the current distances to the borders 21, i.e. the distances measured in the time period between t(0) and t(1) by the distance sensors 3.1, . . . , 3.5;
- the stored width of the implement 11;
- the current pivoting angle α(0) between the tractor 10 and the implement 11 as measured by the pivoting angle sensor 6; and
- the initial actual steering angle β(0) which is measured and transmitted or is assumed to be zero.

If the distances are measured several times between t(0) and t(1), the respective minimum distance is used.

The implement 11 is not self-propelled but is pushed by the tractor 10. For moving the implement 11 according to this required trajectory, the tractor 10 must be steered with a required current steering angle β'=β'(i). The implement's control unit 16 calculates a required steering angle β'(1) at the time point t(1) and concludes a required increment, i.e. a required change Δβ'(1)=β'(1)−β(0) for the current steering angle β(0). For doing so, the implement's control unit 16 uses the following values:

- the stored distance A between the front wheels axle 5 and the rear wheels axle 1 of the tractor 10;
- the stored distance B between the rear wheels axle 1 of the tractor 10 and the pivoting axis 2 of the towing unit 12, 13; and
- the stored distance C between the pivoting axis 2 and the idler axle/axles 4 of the implement 11.

This required steering angle increment Δβ'(1) is displayed on the display unit or on the portable computer or otherwise communicated to the operator (the driver), e.g. by speech output. In an alternative embodiment, this steering angle increment Δβ'(1) is communicated to the tractor's control unit 17 and is used for automatically steering the tractor 10.

In addition, the path sensor 15 measures the distance over which the implement 11 is moved in the time period between t(0) and t(1). The time period is so short that the movement within this time period can be approximated by a linear movement in a direction that is derived from the initial steering angle β(0), i.e. the moving direction of the tractor 10, and the current pivoting angle α(0) between the tractor 10 and the implement 11.

In one embodiment, the actual steering angle β(i) at the time point t(i) is measured by a sensor on board of the tractor 10 and is transmitted from the tractor 10 to the implement 11. In a further embodiment, the actual steering angle β(i) is assumed to equal the calculated required steering angle β'(i).

For every further time point t(i), the implement's control unit 16 calculates a required steering angle β'(i) or a required steering angle change Δβ'(i)=β'(i)−β(i−1), i.e. the difference between the current required steering angle β'(i) and the actual steering angle β(i−1) at the preceding time point t(i−1).

The current steering angle β(i−1) at the time point t(i−1) is transmitted from the tractor 10 to the implement 11 or is assumed to be equal to the required steering angle β'(i−1). The pivoting angle α(i−1) is measured by the pivoting angle sensor 6 at the towing unit 13 of the implement 11.

The implement's control unit 16 again uses the stored distances A, B, C and the trajectory of movement of the implement 11. This trajectory is approximated by a connected sequence of lines l(1), l(2), . . . . Every line l(i) has a length, which equals the distance over which the implement 11 is moved between the time points t(i−1) and t(i). This distance is measured by the path sensor 15, e.g. by counting the number of rotations of the implement's idler axle 4. The direction of the line l(i) is calculated from the difference between the current steering angle β(i) of the tractor 10; and the current pivoting angle α(i) between the implement 11 and the tractor.

The distances between the implement 11 and the tractor 10 are repeatedly measured and are also used for calculating the next required steering angle β'(i).

The term "comprises" does not exclude other elements or steps. The articles "a", "an", and "one" do not exclude a plurality of elements. Features specified in several depending claims may be combined in an advantageous manner.

LIST OF REFERENCES

| | |
|---|---|
| 1 | propelled rear axle of the tractor 10 |
| 2 | vertical pivoting axis between the tractor 10 and the implement 11 |
| 3.1 . . . 3.5 | distance sensors on board of the implement 11 |
| 4 | idler axle of the implement 11 |
| 5 | steerable front axle of the tractor 10 |
| 6 | pivoting angle sensor at the towing unit 13, measures the pivoting angle between the tractor 10 and the implement 11 |
| 10 | tractor, pushes the implement 11 |
| 11 | implement, pushed by the tractor 10 |
| 12 | hitch of the tractor 10, coupled with the towing unit 13 of the implement 11 |
| 13 | towing unit of the implement 11, coupled with the hitch 12 of the tractor 10 |
| 14 | steering mechanism of the tractor 10 |
| 15 | path sensor, measures the path over which the implement 11 is moved, counts the number of rotations of the idler axle 4 |
| 16 | electronic control unit on board of the implement 11, calculates the required travelling direction change |
| 17 | electronic control unit on board of the tractor 10 |
| 20 | area into which the implement 11 has to be moved backwards |
| 21 | border of the area 20 |
| A | distance between the front axle 5 and the propelled rear axle 1 of the tractor 10 |
| B | distance between the rear axle 1 of the tractor 10 and the vertical pivoting axis 2 between the tractor 10 and the implement 11 |
| C | distance between the vertical pivoting axis 2 between the tractor 10 and the implement 11 and the idler axle 4 of the implement 11 |
| D | component of the distance between the initial and the final position of the implement 11 - seen in the travelling direction of the implement 11 |

-continued

| | |
|---|---|
| E | distance between the central longitudinal axis of the implement 11 and the sidewall of the parking lot |
| F | distance between the central longitudinal axis of the implement 11 and the front wall of the parking lot 20 - seen in the travelling direction of the implement 11 |
| G | distance between the idler axle 4 and the rear edge of the implement 11 |
| W | width of the implement 11 |
| α(i) | measured pivoting angle between the implement 11 and the tractor 10 at the time point t(i) |
| β(i) | measured actual steering angle of the tractor 10 at the time point t(i), is the current change of the travelling direction γ(i) |
| β'(i) | calculated required steering angle at the time point t(i) |
| Δβ'(i) | calculated change of desired steering angle at the time point t(i) |
| γ(i) | travelling direction of the tractor 10 at time t(i) |
| t(0) | time point at which the implement 11 passes the parking spot |
| t(1), t(2)... | time points for which required travelling direction changes are calculated |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for moving a combination backwards into an area, the combination comprising a propelled vehicle and an implement mechanically coupled with the propelled vehicle by a towing unit, the propelled vehicle comprising a steering mechanism arranged to change the traveling direction of the propelled vehicle, the implement being is pivotal with respect to the propelled vehicle around a pivoting axis perpendicular to the ground, said method comprising the steps of:
    moving the combination backwards with the propelled vehicle into the area along a path;
    positioning the implement in front of the propelled vehicle when the combination is moved backwards,
    performing, while the combination is moved backwards, the following sequence at least once:
        measuring a value indicative of a pivoting angle of the implement with respect to the propelled vehicle or of the change of this pivoting angle with a pivoting angle sensor;
        measuring a value indicative of a distance to a border of the area in at least one direction with a distance sensor;
        measuring a value indicative of the length of a path along which the implement is moved with a path sensor;
        automatically calculating a required change of the travelling direction of the propelled vehicle with a computer; and
        outputting a signal indicative of the required change of the travelling direction,
    wherein the computer calculates the required change on the basis of said measured pivoting angle or said pivoting angle change, said measured length of the path, and said measured distance, and
    wherein the distance sensor, the path sensor, and the computer are implemented on board of the implement and the pivoting angle sensor is implemented on board of the combination.

2. The moving method according to claim 1, wherein the pivoting angle sensor is implemented on board of the implement.

3. The moving method according to claim 1, wherein the pivoting angle sensor is implemented on board of the propelled vehicle and the pivoting angle or the change of the pivoting angle is transmitted from the pivoting angle sensor to the computer.

4. The moving method according to claim 1, wherein the sequence is performed a first time and, afterwards, the sequence is performed at least one further time,
    wherein, when performing the sequence the first time, the path sensor measures the length of the path over which the implement is moved between a starting time point and a given first time point,
    wherein, when performing the sequence the at least one further time, the path sensor measures the length of the path over which the implement is moved between the preceding time point and a given further time point.

5. The moving method according to claim 1, wherein the area is partially surrounded by a border forming an obstacle for the combination and the distance sensor measures the distance between the implement and the border of the area in the travelling direction of the implement and/or the distance between the implement and the border in a direction perpendicular to the travelling direction of the implement.

6. The moving method according to claim 1, wherein the signal indicative of the required travelling direction change is transmitted to an output unit mounted on board of the propelled vehicle and the output unit outputs the signal in a human-perceptible form.

7. The moving method according to claim 1, wherein the signal indicative of the travelling direction change is transmitted to a portable computer and the portable computer outputs the signal in a human-perceptible form.

8. The moving method according to claim 1, wherein the signal indicative of the travelling direction change is transmitted to a control unit on board of the propelled vehicle and is used by the control unit for automatically changing the travelling direction of the propelled vehicle.

9. The moving method according to claim 1, wherein the sequence further comprises the steps of:
    measuring a signal indicative of the actual travelling direction of the propelled vehicle;
    transmitting the measured signal indicative of the actual travelling direction of the propelled vehicle to the computer; and
    using, with the computer, the transmitted signal indicative of the actual travelling direction for calculating the required change of the travelling direction.

10. An assembly for assisting the movement of a combination backwards into an area, the combination comprising a propelled vehicle and an implement mechanically coupled with the propelled vehicle by a coupling assembly, the implement being pivotal with respect to the propelled vehicle around a pivoting axis perpendicular to the ground, the propelled vehicle comprising a steering mechanism arranged to change a traveling direction of the propelled vehicle, the propelled vehicle being arranged to move the combination in a backward direction wherein the implement is in front of the propelled vehicle when the combination is moved backwards, the assembly for assisting the movement of a combination backwards into an area comprising:
- a path sensor;
- a distance sensor;
- a pivoting angle sensor;
- a computer; and
- an output unit,
- wherein the path sensor is arranged to measure a signal indicative of the length of a path along which the implement is moved,
- wherein the distance sensor is arranged to measure a value indicative of a distance between the implement and a border of the area in at least one direction,
- wherein the pivoting angle sensor is arranged to measure a value indicative of a pivoting angle of the implement with respect to the propelled vehicle or of the change of the pivoting angle,
- wherein the computer is arranged to calculate a required change of the travelling direction of the propelled vehicle on the basis of said pivoting angle or said pivoting angle change, said length of the path, and said distance,
- wherein the output unit is operatively connected to the computer and is arranged to generate and to output a signal indicative of a required change of the travelling direction,
- wherein the distance sensor, the path sensor, and the computer are implemented or are suitable to be implemented on board of the implement and the pivoting angle sensor is implemented or is suitable to be implemented on board of the combination.

11. The assembly according to claim 10, wherein the pivoting angle sensor is implemented or is suitable to be implemented on board of the implement.

12. The assembly according to claim 10, wherein the pivoting angle sensor is implemented or is suitable to be implemented on board of the propelled vehicle and the combination comprises a transmitting unit, and wherein the transmitting unit is arranged to transmit a signal indicative of the pivoting angle or the change of the pivoting angle from the pivoting angle sensor to the computer.

13. The assembly according to claim 10, wherein the output unit is implemented on a portable computer, and wherein the portable computer is arranged to output a required travelling direction change in a human-perceptible form.

14. A combination comprising:
- a propelled vehicle;
- an implement mechanically coupled with the propelled vehicle by a coupling assembly; and the assembly according to claim 10,
- wherein the distance sensor, the path sensor, and the computer are implemented on board of the implement and the pivoting angle sensor is implemented on board of the combination.

15. The combination according to claim 14, wherein the coupling assembly comprises a part belonging to the propelled vehicle and a corresponding part belonging to the implement, and wherein the pivoting angle sensor is arranged to measure a value indicative of the pivoting angle or the pivoting angle change between said part belonging to the propelled vehicle and said corresponding part belonging to the implement.

16. An implement comprising:
- a coupling unit; and
- the assembly according to claim 10,
- wherein the distance sensor, the path sensor, the computer, and the pivoting angle sensor are implemented on board of the implement and the coupling unit is arranged to be coupled with a corresponding coupling unit of a propelled vehicle to thereby form a combination.

* * * * *